United States Patent
Parveen et al.

(10) Patent No.: US 7,769,166 B2
(45) Date of Patent: Aug. 3, 2010

(54) DUAL MODE AES IMPLEMENTATION TO SUPPORT SINGLE AND MULTIPLE AES OPERATIONS

(75) Inventors: Nasima Parveen, San Jose, CA (US); Venkatesh Balasubramanian, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 1014 days.

(21) Appl. No.: 11/509,361

(22) Filed: Aug. 24, 2006

(65) Prior Publication Data

US 2008/0069339 A1 Mar. 20, 2008

(51) Int. Cl.
*H04L 9/32* (2006.01)
*H04L 9/08* (2006.01)
*H04K 1/00* (2006.01)
*H04K 1/04* (2006.01)
*G06F 1/00* (2006.01)
*G06F 7/72* (2006.01)

(52) U.S. Cl. .............. 380/28; 380/29; 380/37; 380/284; 713/170

(58) Field of Classification Search .......... 380/28, 380/37, 284
See application file for complete search history.

(56) References Cited

U.S. PATENT DOCUMENTS

| 2003/0198345 | A1 | 10/2003 | Van Buer | 380/43 |
| 2003/0235310 | A1* | 12/2003 | Saito et al. | 380/284 |
| 2004/0080335 | A1 | 4/2004 | Goodman | 326/16 |
| 2005/0147239 | A1* | 7/2005 | Chin et al. | 380/28 |

FOREIGN PATENT DOCUMENTS

EP     1557740 A2 *  7/2005

OTHER PUBLICATIONS

Wei Hu, Jason Hiser, Dan Williams, Adrian Filipi, Jack W. Davidson, David Evans, John C. Knight, Anh Nguyen-Tuong, Jonathan Rowanhill, "Secure and practical defense against code-injection attacks using software dynamic translation", Jun. 2006, VEE '06: Proceedings of the 2nd international conference on Virtual execution environments, pp. 2-12.*

* cited by examiner

*Primary Examiner*—Michael Pyzocha
*Assistant Examiner*—Courtney D Fields
(74) *Attorney, Agent, or Firm*—Christopher P. Maiorana, PC

(57) ABSTRACT

An apparatus comprising a mode circuit and an encryption circuit. The mode circuit may be configured to selectively provide register input data on an output signal when in a first mode and memory data on the output signal when in a second mode. The encryption circuit may be configured to interchangeably encrypt/decrypt between the register input data and the memory data.

19 Claims, 4 Drawing Sheets

US 7,769,166 B2

DUAL MODE AES IMPLEMENTATION TO SUPPORT SINGLE AND MULTIPLE AES OPERATIONS

FIELD OF THE INVENTION

The present invention relates to encryption schemes generally and, more particularly, to a dual mode advanced encryption standard (AES) implementation to support single and multiple AES operations.

BACKGROUND OF THE INVENTION

AES is a popular encryption standard used in several encryption schemes. AES operates on 128 bits at a time. Several AES-based encryption schemes have been developed which operate on data sizes larger than 128 bits. AES-based encryption schemes fail to provide an interface that can effectively use an AES core unit that operates on 128 bits while performing the core AES operation.

One possible solution to such a problem is to implement a direct memory access (DMA) interface around the AES core unit. Such a DMA interface is programmed by a host processor. The DMA interface can (i) fetch data from a synchronous dynamic random access memory (SDRAM), (ii) feed the data to the AES core unit, and (iii) store the encrypted/decrypted data to the SDRAM. Using such an interface, AES operation can be performed on data blocks that are much larger than 128 bits.

The main disadvantage of the DMA interface is the overhead associated with setting up the operation of the DMA interface. Designers have to program (i) the addresses of the input and output data and (ii) the sector count. The overhead is minimal if the sector size/count is large. However, in the case of an AES application where an encryption/decryption of 128 bits or 256 bits is needed, the overhead may be large when compared to the actual operation.

Another disadvantage with conventional approaches is that new AES-based encryption schemes are always being developed. Some of these schemes may include quirks that may not be supported by the DMA interface mode since the DMA interface automatically processes input data. An alternate to such an approach is to use a micro-controller to perform the entire encryption scheme in software. The use of a micro-controller may slow the encryption/decryption process down.

It would be desirable to provide a method and/or apparatus for a dual mode AES implementation to support single and multiple AES operations.

SUMMARY OF THE INVENTION

The present invention concerns an apparatus comprising a mode circuit and an encryption circuit. The mode circuit may be configured to selectively provide register input data on an output signal when in a first mode and memory data on the output signal when in a second mode. The encryption circuit may be configured to interchangeably encrypt/decrypt between the register input data and the memory data.

The objects, features and advantages of the present invention include providing a method and/or apparatus for a dual mode AES implementation to support single and multiple AES operations that may (i) need a small amount of data (ii) be performed with a smaller overhead using a register interface, (iii) prevent encrypted/decrypted data from being compromised and (iv) allow for AES-based encryption schemes not supported by the DMA mode to be performed one block at a time.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
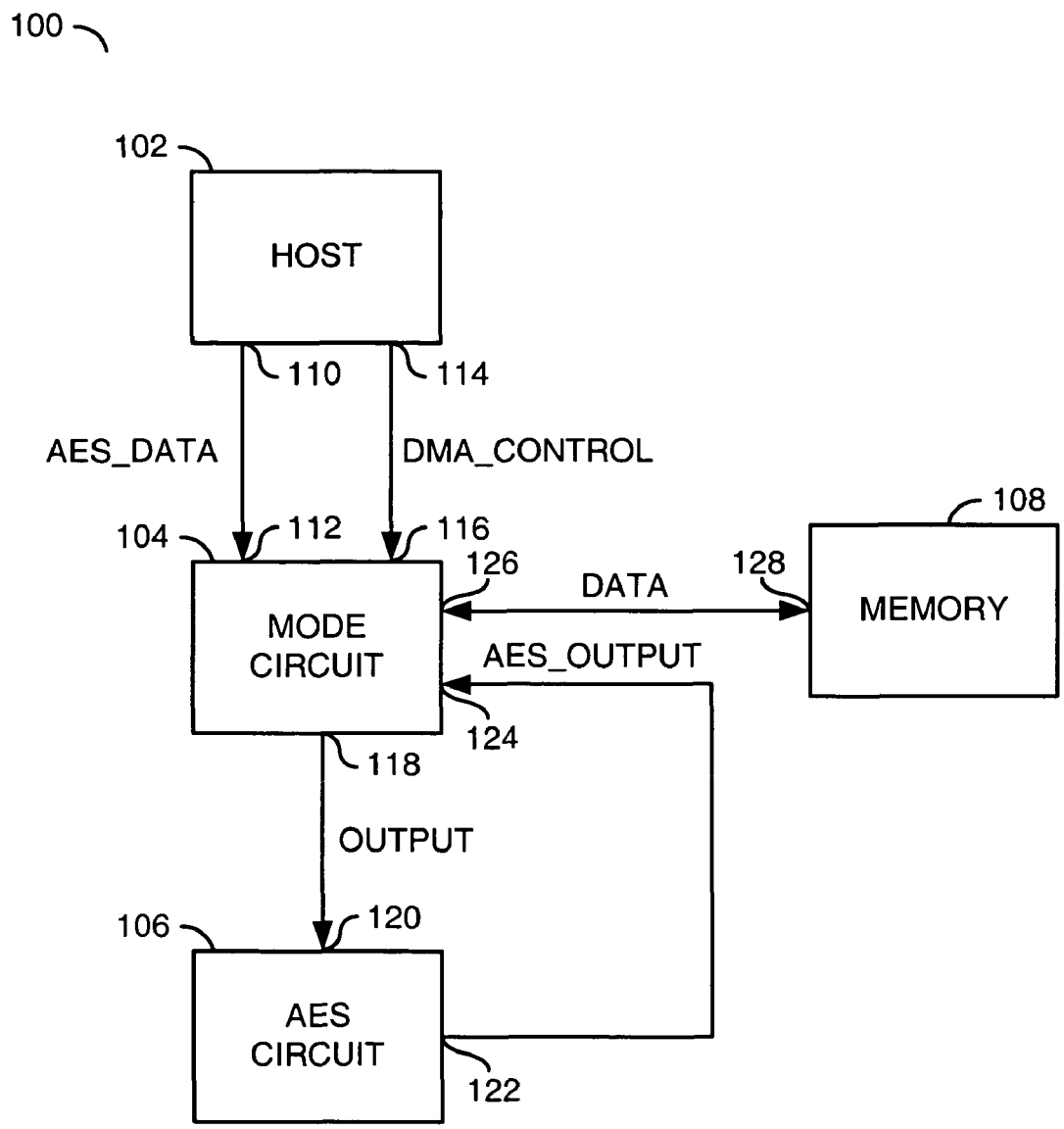
FIG. 1 is a diagram of a preferred embodiment of the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, and a block (or circuit) 108. The circuit 102 may be implemented as a host processor. The circuit 104 may be implemented as a mode circuit. The circuit 106 may be implemented as an AES circuit. The circuit 108 may be implemented as memory. In one example, the memory 108 may be implemented as a SDRAM. The host processor 102 may have an output 110 that may present a signal (e.g., AES_DATA) and an output 114 that may present a signal (e.g., DMA_CONTROL). The mode circuit 104 may have an input 112 that may receive the signal AES_DATA, an input 116 that may receive the signal DMA_CONTROL, an input 124 that may receive a signal (e.g., AES_OUTPUT) and an input/output 126 that may receive/present a signal (e.g., DATA). The mode circuit 104 may have an output 118 that may present a signal (e.g., OUTPUT). The AES circuit 106 may have an input 120 that may receive the signal OUTPUT. The AES circuit 106 may have an output 122 that may present the signal AES_OUTPUT. The memory 108 may have an input/output 128 that may present/receive the signal DATA.

The mode circuit 104 may provide register input data on the signal OUTPUT when the system is in a first mode (or register mode). The mode circuit 104 may provide memory data on the signal OUTPUT when the system is in a second mode (or DMA mode). The AES circuit 106 may interchangeably encrypt/decrypt between the register input data and the memory data in accordance with an AES encryption/decryption scheme. By providing input register data in the register mode and memory data in the DMA mode, the encryption/decryption of data performed by the AES circuit 122 may use less overhead than conventional systems. The host processor 102 may generate AES keys used to perform the AES encryption/decryption operation. The host processor 102 may present the AES keys over the signal AES_DATA. The AES keys are generally needed to perform AES encryption/decryption when the system 100 is in the register mode or in the DMA mode. The AES keys may be produced by a pseudo random number generator, as a private key of a public-private key pair of asymmetric keys, as part of a datastream, or with another appropriate mechanism.

Figure 2:
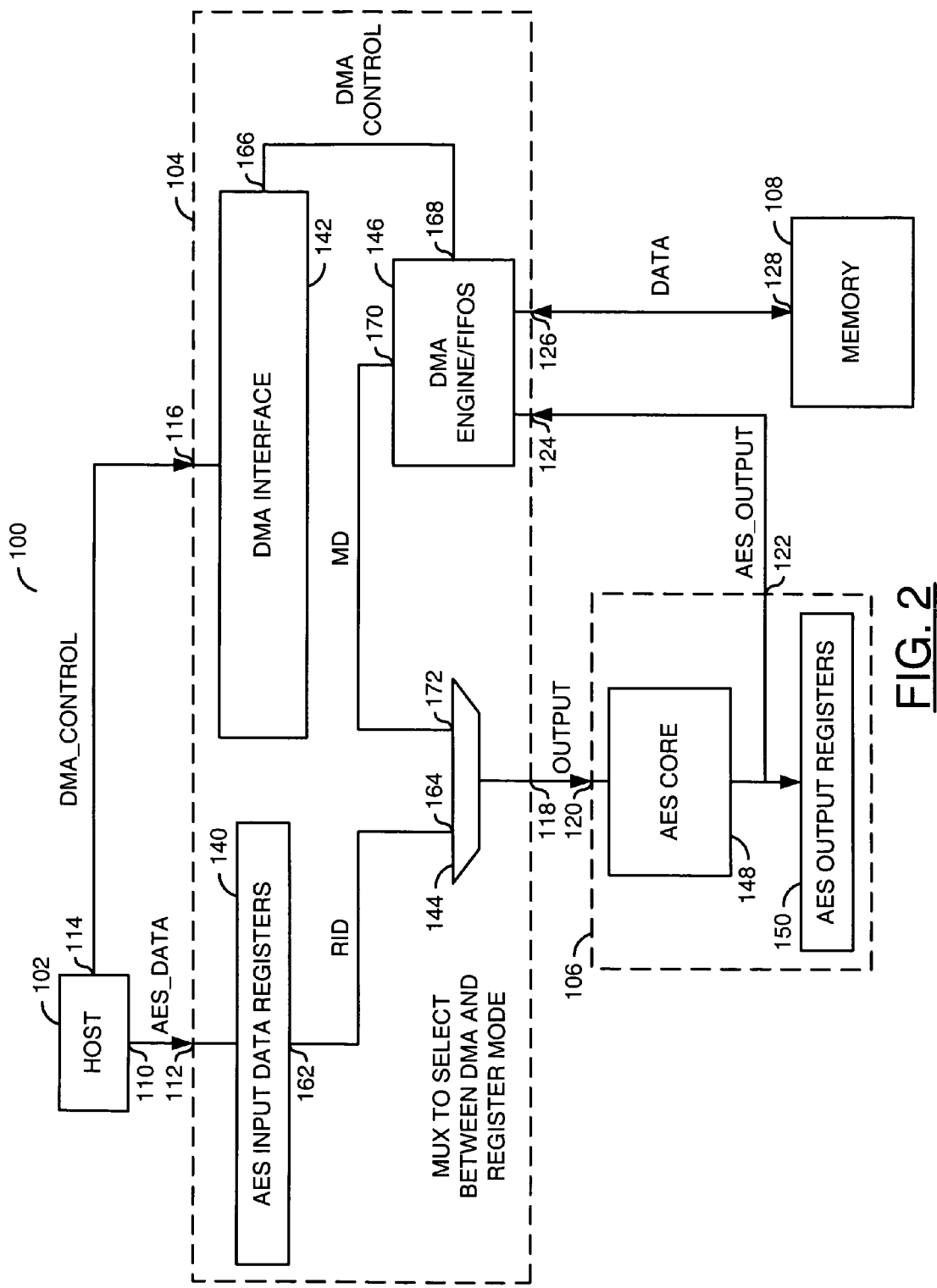
FIG. 2 is a detailed diagram of a preferred embodiment of the present invention.

Referring to FIG. 2, a more detailed diagram of the system 100 is shown. The mode circuit 104 generally comprises a block (or circuit) 140, a block (or circuit) 142, a block (or circuit) 144 and a block (or circuit) 146. The circuit 140 may be implemented as one or more AES input data registers. The circuit 142 may be implemented as a DMA interface circuit. The circuit 144 may be implemented as a multiplexer. The circuit 146 may be implemented as a DMA engine circuit. The DMA engine 146 may be implemented as one or more FIFO circuits. The AES input data register 140 may have an output 162 that may present a signal (e.g., RID). The DMA interface circuit 142 may have an output 166 that may present the signal DMA control. The multiplexer 144 may have an input 164 that may receive the signal RID and an input 172 that may receive a signal (e.g., MD). The DMA engine 146 may have an input 168 that may receive the signal DMA_CONTROL and an output 170 that may present the signal MD. The AES circuit 106 generally comprises a block (or circuit) 148 and a block (or circuit) 150. The circuit 148 may be implemented as an AES core circuit. The circuit 150 may be implemented as one or more AES output registers.

In the DMA mode, the host processor 102 may (i) control the DMA engine 146 (via the DMA interface 142) to fetch data (or memory data) over the signal DATA from the SDRAM 108 and (ii) present the memory data over the signal MD to the multiplexer 144. The multiplexer 144 may present the memory data to the AES core 148. The AES core 148 may (i) encrypt/decrypt the memory data and (ii) present the encrypted/decrypted memory data over the signal AES_OUT to the DMA engine 146. The DMA engine 146 may present the encrypted/decrypted data over the signal DATA back to the memory 108. The DMA interface 142 circuit in conjunction with the host processor 102 may (i) initiate DMA transfer operations between the DMA engine 146 and the memory 108, and (ii) send relevant parameters (e.g., including memory addresses, the size of the DMA transfer, and the DMA transfer direction (the direction of the memory data read from or written to the memory 108)) between the DMA engine 146 and the memory 108. The DMA Engine 146 may interface with the memory 108 and perform the actual memory transaction.

In the DMA mode, the system 100 may handle both packetized and non-packetized blocks of memory data. A packetized block of memory data includes a header section and a payload section. With packetized input blocks of data, the payload section may be processed via the AES encryption/decryption operation. The header section may remain unaltered during the AES encryption/decryption operation. While performing the AES operation, the system 100 may identify the header and payload section on-the-fly and process only the payload section.

In the register mode, the host processor 102 may program the register input data via the signal AES_DATA into the AES input data register 140. The AES input data register 140 may present the register input data over the signal RID to the multiplexer 144. The multiplexer 144 may present the register input data over the signal OUTPUT to the AES core unit 148. An AES control register (not shown) may be used by the multiplexer 144 to perform switching between the DMA mode and the register mode. If data for AES encryption/decryption is available in the AES input data register 140, a mode bit in the AES control register may be set to one. If there is no data in the AES control register, the mode bit in the AES control register may be set to zero (e.g., data may be available in the DMA engine 146 in such a case). Based on the value of the mode bit, the multiplexer 144 may select data from the AES input data register 140 (e.g., mode bit set to one) or from the DMA engine 170 (e.g., mode bit set to zero). The AES core unit 148 may (i) encrypt/decrypt the register input data and (ii) store the encrypted/decrypted register input data in the AES output register 150. The AES core unit 148 may perform any chaining as needed between the encryption and decryption operation using the register mode.

In general, chaining may use an input or an output from an AES block either as an input or as a key to the next AES block. In one example, for Cipher Block Chaining (CBC), input (e.g., AES decrypt) or output (e.g., AES encrypt) from one AES block may be used as input to a next AES block, (e.g., AESHash), where output from one AES block may be used as a key to the next AES block.

Chaining may be performed in both register and DMA modes. For both the DMA mode and the register mode, the same AES operation may be performed. The AES encryption/decryption may be performed from one 16-byte AES block to the next 16-byte AES block. Cipher mode may also remain the same from block to block. Since register mode operates on 16-byte block of data per AES command, the AES operation may change from one 16-byte block to another. Therefore, different AES operations and cipher modes may be chained in the register mode.

Figure 3:
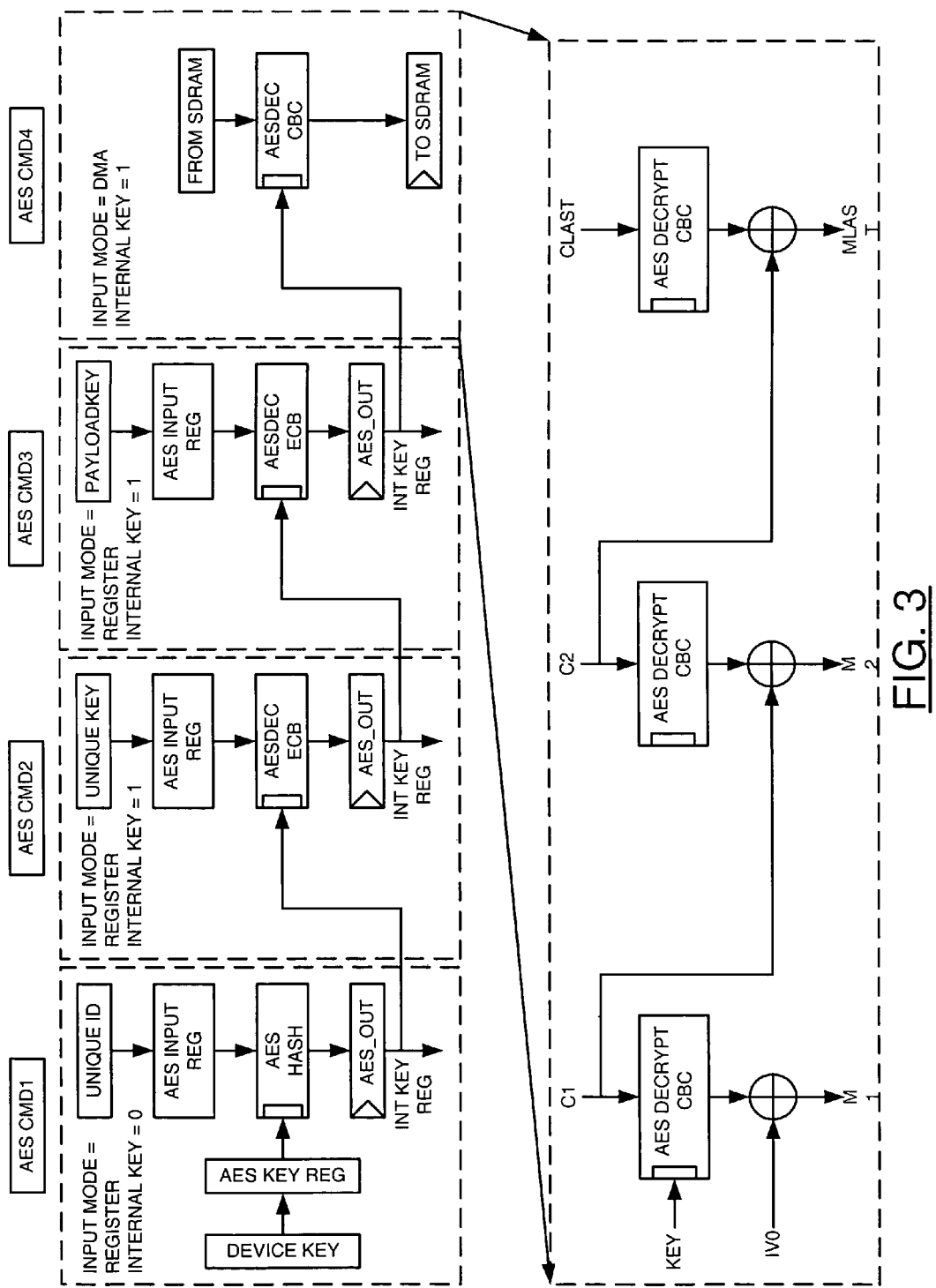
FIG. 3 is a diagram illustrating an example of chaining AES commands.

Referring to FIG. 3, a diagram illustrating an example of chaining a number of AES commands are shown. Three AES operations may be needed to generate keys to perform encryption/decryption on the payload.

In a first command (or AES cmd1), a Device key and a Unique ID may be used to produce a Root key. An AES key register may be set to the Device key. The AES input register data may be set to a unique ID. An AES operation may be set to perform encryption. An AES mode may be set to an AESHASH.

In a second command (or AES cmd2), the Root key (e.g., as generated by the first command) may be used to produce a Unique key. The AES input register data may be set to an encrypted Unique key. A Use Internal key may be set to 1. The AES operation may be set to perform decryption. The AES mode may be set to an Electronic Code Book (ECB) mode.

In a third command (or AES cmd3), the Unique key (e.g., as generated by the second command) may be used to produce a Payload key. The AES input register data may be set to an encrypted Payload key. The Use Internal key may be set to 1. The input mode may be set to the register mode. The AES operation may be set to perform decryption. The AES mode may be set to the ECB mode.

Each command (e.g., the first command, the second command and the third command) may illustrate an independent AES operation. Each command may operate on a different data block while performing both encryption and decryption. The AES output of the first command may be used as a key for the second AES operation. The AES output of the second command may be used as a key for the third AES operation. Once the Payload key is produced, an AES operation on the payload data may be performed in DMA mode. Such an operation may be illustrated in the fourth command (e.g., AES cmd4). In the fourth command, the Use Internal key may be set to 1. The input mode may be set to the DMA mode. The AES operation may be set to perform decryption. The AES mode may be set to the CBC mode. In the chaining example illustrated in FIG. 3, the key produced in prior commands may be used directly in the subsequent command without explicitly setting the key register by the host processor. The large AES block used in DMA mode may be (i) split into multiple 16-byte blocks and (ii) encrypted/decrypted while in the register mode with reduced performance.

The present invention may allow for DMA or register modes to be supported by an AES encryption/decryption scheme. The DMA mode and the register mode may be supported by the AES core unit 148. By supporting the DMA mode and the register mode, the AES core unit 148 may encrypt/decrypt data using a lower overhead. When performing an AES encryption/decryption operation for a block size less than or equal to 128 bit (e.g., AES data block size), processing data in the input data register 140 may be faster than processing data in the memory 108. Performing an AES encryption/decryption in the register mode 140 is faster since the overhead associated in performing DMA transfer operations is much higher than that of simply setting the AES input data registers 162 with the necessary data. While performing a DMA transfer in the DMA mode, overhead may be increased because of the DMA transfer setup (e.g., initiating DMA request and/or sending DMA transfer parameters to the memory controller (not shown)) and the actual DMA transfer latency.

The following examples illustrates the overhead associated with loading 128-bit data block in the register mode and in the DMA mode.

In the register mode, each AES input data register 140 may be 32-bits wide and need 4 host processor clock cycles to set the 32-bit registers. To load 128-bits of data, the register mode may need a total of four registers and use a total of 16 host processor clock cycles.

In the DMA mode, the DMA transfer setup time may need 8 host processor clock cycles to set the memory address and the size of the input block. While (i) initiating a DMA request, (ii) obtaining an acknowledgment for a DMA transfer from the memory controller and (iii) sending the DMA transfer parameters to the memory controller, 16 host processor clock cycles on average may be used. In addition, in order to perform a DMA transfer latency, the actual transfer may take between 2 to 4 clock cycles. In general, the number of cycles that the memory controller may need to set the memory for an actual DMA transfer may be 16 clock cycles. Overall, the DMA mode may need anywhere from 32 to 40 cycles (under a best case scenario) to transfer 128-bits or 16-bytes of input memory data.

As the size of input register data increases, the register mode may become less efficient. In addition to setting the AES input data registers 140 for a new 128-bit block, the system 100 may need to determine if the AES operation on the previous block of data has been completed. Such a determination may also add to the overhead for the register mode. For example, for four 128-bit blocks, the DMA mode may need about 32-40 host processor clock cycles. In the register mode, 80 cycles (e.g., 4*4*4+16 (polling overhead)) (best case) may be needed. The system 100 may maintain an optimal size of input register data to ensure minimal overhead when in the register mode.

In general, encrypted/decrypted data may not be stored in the memory 108 when the system 100 is in the register mode. Since the encrypted/decrypted data may not be stored in the memory 108, the encrypted/decrypted data may not be compromised by interrogating the memory 108 (e.g., SDRAM pins). In such an access scheme, an application may access the AES output registers 150 directly and use the encrypted/decrypted data as needed. Such an access scheme may prevent the interrogation of pins which interface the memory 108. The system 100 may be adapted to allow for the storage of encrypted/decrypted data in the memory 108 if desired. For example, an application may store decrypted data from the AES output register 150 into the memory 108 if necessary.

Figure 4:
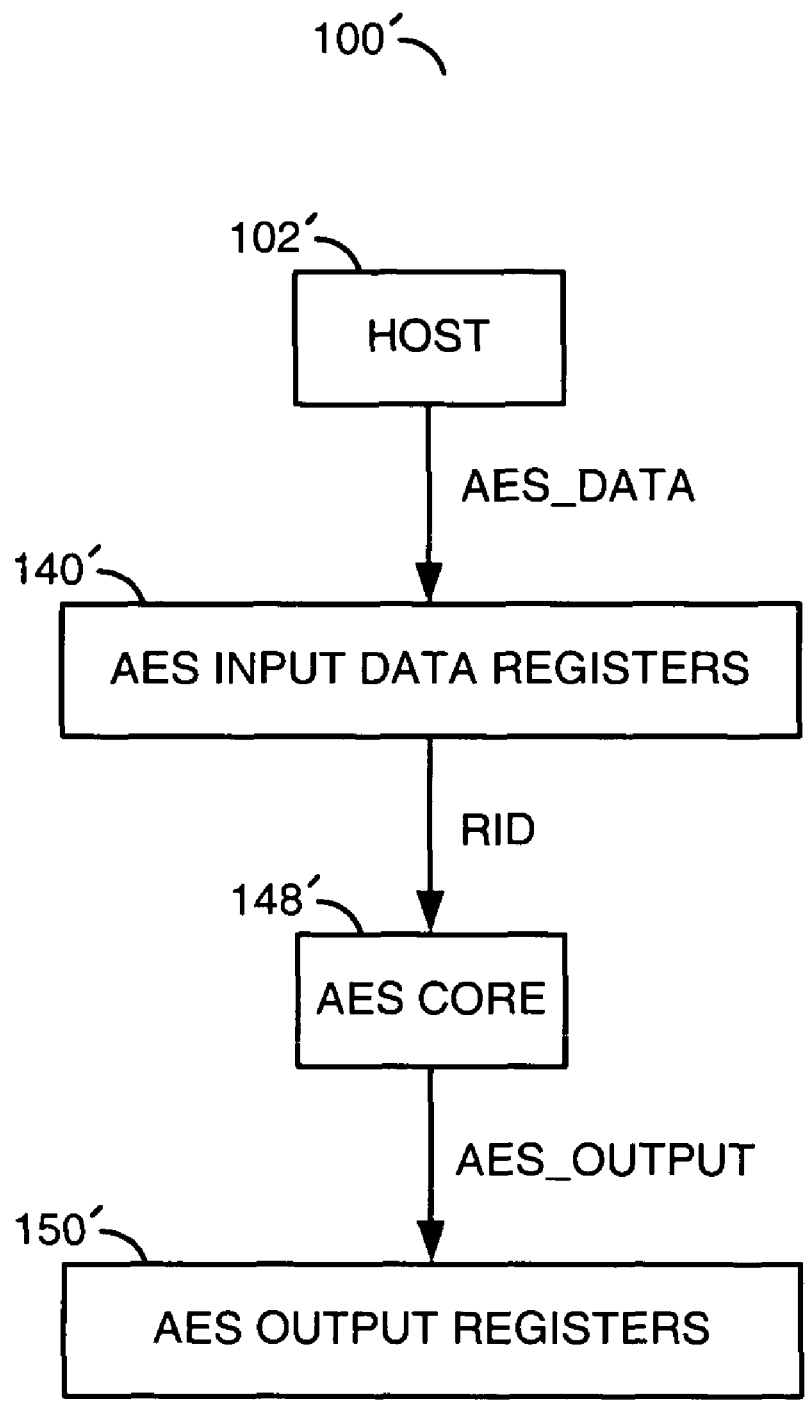
FIG. 4 is a diagram of an alternative embodiment of the present invention.

Referring to FIG. 4, a system 100' is shown in accordance with another embodiment of the present invention. The system 100' may operate similarly to the system 100 in the register mode. The system 100' may operate only in the register mode without the need to switch to the DMA mode. A host processor 102' may generate AES keys used to perform AES encryption/decryption operations. A number of AES input data registers 140' may provide register input data to an AES core unit 148'. The AES core unit 148' may provide decrypted data over the signal AES_OUTPUT. A number of AES output registers 150' may store decrypted data in the AES output registers 150'. The decrypted data stored in the AES output registers 150' may be read by software. The software may store the output (e.g., the decrypted data) to memory (not shown).

AES-based encryption schemes supported only by the register mode may still be performed a block at a time while in the register mode. When the system 100' operates in the register mode, more overhead may be exhibited than by operating the system in the dual mode between the register mode and the DMA mode. However, the overhead may be less than performing the entire operation in software or solely in the DMA mode.

The register mode whether performed in the system 100 or the system 100', may be suitable for key generation or key extraction for subsequent AES encryption/decryption operations from a root key. Most multimedia content may use several stages for producing the key for encrypting/decrypting payloads. The stages may be distinct and the input block size may be less than 128-bit. The system 100 may provide for keys to be generated for subsequent AES encryption/decryption on a large block of data without having the key become visible to the user.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a mode circuit configured to selectively provide register input data on an output signal when in a first mode and memory data on said output signal when in a second mode, wherein said register input data and said memory data are separate from said output signal; and
   an encryption circuit configured to interchangeably encrypt/decrypt said output signal of said mode circuit between said register input data and said memory data, wherein said first mode prevents said encryption circuit from encrypting/decrypting said memory data.

2. The apparatus according to claim 1, further comprising a host processor configured to present (i) said register input data on an encryption data signal when in said first mode and (ii) a memory control signal when in said second mode.

3. The apparatus according to claim 1, further comprising a memory coupled to said mode circuit and configured to store encrypted/decrypted data when in said second mode.

4. The apparatus according to claim 1, wherein said mode circuit comprises one or more input data registers configured to store said register input data.

5. The apparatus according to claim 4, wherein said mode circuit further comprises:
   a memory engine configured to present said memory data in response to a memory control signal.

6. The apparatus according to claim 5, wherein said mode circuit further comprises:
   a multiplexer configured to present (i) said input register data from said one or more registers when in said first mode and (ii) said memory data from said memory engine when in said second mode.

7. The apparatus according to claim 6, wherein said encryption circuit further comprises:
   an advanced encryption standard core unit configured to encrypt/decrypt said register input data and said memory data.

8. The apparatus according to claim 7, wherein said encryption circuit further comprises:
  one or more output registers configured to store encrypted/decrypted register input data.

9. The apparatus according to claim 7, wherein said advanced encryption standard core unit presents encrypted/decrypted memory data to said memory engine.

10. The apparatus according to claim 9, wherein said memory engine presents said encryption/decryption memory data to a memory.

11. The apparatus according to claim 1, wherein said encryption circuit is configured to interchangeably encrypt/decrypt between said register input data and said memory data while performing chaining.

12. The apparatus according to claim 1, wherein said encryption circuit is configured to perform encryption/decryption on said register input data and said memory data in accordance to an advanced encryption standard (AES).

13. The apparatus according to claim 1, wherein said encryption circuit encrypts/decrypts packetized and non-packetized blocks of data when in said second mode.

14. The apparatus according to claim 13, wherein said packetized blocks of data includes a payload section and a header section and said encryption circuit performs encryption/decryption operations on said payload section and said header section remains unaltered during the encryption/decryption operation.

15. An apparatus comprising:
  a first circuit having one or more input registers and configured to present register input data from said one or more input registers,
  a second circuit configured to encrypt/decrypt said register input data when in a first mode and memory data when in a second mode, each in accordance to an advanced encryption standard (AES), wherein said first mode prevents said second circuit from encrypting/decrypting said memory data; and
  a memory (i) coupled to said first circuit, configured to store and present said encrypted/decrypted data and (ii) configured to store said encrypted/decrypted data only when in said second mode.

16. A method for performing a dual mode encryption/decryption operation comprising the steps of:
  (a) selectively providing register input data on an output signal when in a first mode and memory data on said output signal when in a second mode,
  (b) interchangeably encrypting/decrypting between said register input data and said memory data, wherein said first mode prevents said encrypting/decrypting of said memory data; and
  (c) encrypting/decrypting data in a memory only when in said second mode.

17. The method according to claim 16 further comprising the step of:
  storing encrypted/decrypted data on a memory when in said second mode.

18. The method according to claim 16 further comprising the step of:
  storing said register input data on one or more input data registers.

19. The method according to claim 16 further comprising the step of:
  performing an encryption/decryption operation on said register input data and said memory data in accordance with an advanced encryption standard.

* * * * *